United States Patent [19]

Mancuso

[11] Patent Number: 4,932,685

[45] Date of Patent: Jun. 12, 1990

[54] VARIABLE COLOR PRINT AND METHOD OF MAKING SAME

[76] Inventor: Robert J. Mancuso, 209 Hunting Ave., Needham, Mass. 02192

[21] Appl. No.: 304,900

[22] Filed: Jan. 31, 1989

Related U.S. Application Data

[63] Continuation of Ser. No. 2,783, Jan. 13, 1987, abandoned.

[51] Int. Cl.[5] .......................... B42D 15/00; G09C 1/00; G06K 9/74

[52] U.S. Cl. .......................................... 283/91; 283/74; 356/71

[58] Field of Search ........................ 283/74, 90, 91, 92, 283/93, 94, 74, 91; 428/29, 156, 916, 915; 356/71; 427/7; 350/162.17, 162.18

[56] References Cited

U.S. PATENT DOCUMENTS

| | | | |
|---|---|---|---|
| 3,471,172 | 10/1969 | Bkyha | 283/74 |
| 4,033,059 | 7/1977 | Hutton et al. | 283/91 |
| 4,124,947 | 11/1978 | Kuhl et al. | 283/91 |
| 4,211,918 | 7/1980 | Nyfeler et al. | 356/71 |
| 4,417,784 | 11/1983 | Knop et al. | 283/91 |
| 4,484,797 | 11/1984 | Knop et al. | 283/91 |
| 4,568,141 | 2/1986 | Antes | 283/91 |
| 4,576,439 | 3/1986 | Gace et al. | 283/91 |
| 4,588,212 | 5/1986 | Castagnoli | 283/91 |

*Primary Examiner*—Douglas D. Watts
*Assistant Examiner*—Paul M. Heyrana, Sr.
*Attorney, Agent, or Firm*—Joseph S. Iandiorio

[57] ABSTRACT

A variable color print of an image including an image medium having a plurality of differently oriented local image regions. Each region includes a number of periodic variations in an optical characteristic of the medium which extend substantially in a first direction within that region and are generally parallel to each other in a second direction transverse to the first direction. Each region further includes a number of periodic variations in color which extend in the first direction and are generally parallel to each other in the second direction and are generally aligned with the periodic optical variations in that region. The periodic optical variations selectively prevent viewing of one or more of the color variations at different viewing angles to generate changes in color of the viewed image as the viewing angle changes. A method of forming such a variable color print is also disclosed.

8 Claims, 5 Drawing Sheets

VARIABLE COLOR PRINT AND METHOD OF MAKING SAME

This is a continuation of application Ser. No. 07/002,783, filed Jan. 13, 1987 abandoned Jan. 31, 1931..

FIELD OF INVENTION

This invention relates to a print, and method of making same, having a number of different colors, and more particularly to such a print including a number of different local image regions which are oriented differently from each other, each region having optical variations which selectively prevent viewing of one or more of the colors at different viewing angles.

BACKGROUND OF INVENTION

A number of different objects display different images, or different views of an image, depending on the angle by which the object is viewed. Some objects such as holographs utilize diffraction to separate white light into its spectral components. A diffraction grating, having 20,000 to 50,000 lines per inch, reflects or transmits different portions of the incident spectrum. The portions are seen as a view in color of an image which changes as the angle of incidence changes. The process of manufacturing the diffraction grating, however, requires great accuracy and is expensive.

Rather than utilize the diffraction principle, some objects are provided with embossed foil having far fewer lines per inch which reflects white light as light and dark lines. The reflected lines appear to shift as the viewing angle changes, but changes in color are not produced.

Other embossed objects are printed with different colors. The arrangement of the printed pigments in relation to embossed lines can establish a moire pattern which interferes with the intended image. For some prints the objectionable moire patterns must be overcome by printing different colors as dots at a different periodicity than the periodicity of the embossed pattern.

Yet other objects utilize a lenticular construction in combination with color pigments. Lenticular films have a number of tiny semi-cylindrical lenses, known as lenticules, which are typically formed as parallel ridges embossed on the base side of the film. The lenticules extend in parallel across the entire surface of the film and alter the manner in which the underlying emulsion is exposed by the subject and any intervening color filters. Lenticular films are often used to generate a stereoscopic effect by revealing left and right images as the viewing angle changes. A lenticular print can similarly be made through printing techniques using halftone dots. However, individual regions of the image are not oriented differently from each other so that the colors change differently according to the viewing angle.

SUMMARY OF INVENTION

It is therefore an object of this invention to provide an improved multicolored print which includes a number of contrasting regions that readily change color with the viewing angle.

It is a further object of this invention to provide such a variable color print which can be formed by printing within standard tolerances.

Yet another object of this invention is to provide such a variable color print which has a different appearance than conventional prints.

It is a further object of this invention to provide such a variable color print which is inexpensive to manufacture.

A still further object of this invention is to provide an improved method of forming such a variable color print.

The invention results from the realization that a visually pleasing and intriguing image having variable colors can be achieved by constructing a print having periodic variations in an optical characteristic, such as variations in transmissivity or reflective angle, which are generally parallel within each of a number of local image regions, the local image regions being differently oriented in relation to each other, and the print further including periodic variations in color generally aligned with the periodic optical variations within each region so that one or more of the colors are selectively subdued or hidden at different viewing angles while one or more of the remaining colors are revealed to generate changes in color of the viewed image.

This invention features a variable color print of an image including an image medium having a plurality of differently oriented local image regions. Each region includes a plurality of periodic variations in an optical characteristic of the medium which extend substantially in a first direction within that region and are generally parallel to each other in a second direction transverse to the first direction. Each region further includes a plurality of periodic variations in color which extend in the first direction and are generally parallel to each other in the second direction and are generally aligned with the periodic optical variations in that region. The periodic optical variations selectively prevent viewing of one or more of the color variations at different viewing angles to generate changes in color of the viewed image as the viewing angle changes.

In one embodiment, local image regions are oriented in relation to each other such that for each viewing angle at least two different colors, each in a different local image region, are visible for the image. The periodic optical variations prevent viewing of the two different colors at a different viewing angle and enable viewing of two other colors. The periodic optical variations may include cyclic changes in transmissivity of the image medium such as a plurality of opaque lines. The periodic color variations may be spaced from the opaque lines in a third direction normal to the first and second directions. The opaque lines may be disposed on a first surface of the image medium and the periodic color variations disposed on a second surface of the image medium which may be translucent or transparent.

In another embodiment, the periodic optical variations include repeated changes in the reflective angle of the image medium. The image medium may include a substrate and a reflective material disposed on the substrate, and the repeated changes may include sinusoidal undulations in a reflective surface of the image medium. The undulations may include a number of grooves established in the reflective surface and the periodic color variations may be spaced from the repeated changes in reflective angle. Each local image region includes at least sixty-five optical variations per inch, preferably one hundred to four hundred per inch, and different local image regions represent different intensities of the image.

This invention further features a method of forming a color print of an image, including designating different regions of the image, selecting a line pattern for each region, and establishing a pattern mask of the image having line patterns oriented differently for the respective regions. The method further includes transferring the pattern mask to an image medium, and forming a number of color images from the pattern mask, there being one color image for each color selected for the print. Each selected color is transferred to the image medium to generally align the colors with the pattern to selectively prevent viewing of one or more of the colors at different viewing angles and generate changes in color of the viewed image as the viewing angle changes. This invention also features the variable color print formed by this method.

In one embodiment, the transferring includes generating a die from the pattern mask and impressing the image medium with the die such as by heat transfer debossing. In another embodiment, the image medium is translucent and transferring includes placing the pattern mask on the translucent image medium to selectively vary the transmissivity of the image medium.

In yet another embodiment, forming a plurality of color images includes making a printing plate for each color to represent the respective color image and selecting different densities at which each color is to be printed for different regions of the image. Different regions of the image may be designated by identifying different intensities of the image, selecting a line pattern for each intensity, and establishing a pattern mask having the line patterns oriented differently for the respective intensity regions.

DISCLOSURE OF PREFERRED EMBODIMENT

Other objects, features and advantages will occur from the following description of a preferred embodiment and the accompanying drawings, in which.

This invention may be accomplished by a variable color print having a number of differently oriented local regions each having periodic variations in an optical characteristic. Each local region further includes periodic variations in color which are generally aligned with the periodic optical variations. The periodic optical variations selectively prevent viewing of one or more of the colors at different viewing angles.

In one construction the periodic optical variations are repeated changes in reflective angle such as grooves embossed in a reflective foil. In another construction the periodic optical variations are cyclic changes in transmissivity such as a number of opaque lines associated with a transparent substrate.

This invention also encompasses a method of forming such a variable color print. Different regions of an image are designated, and a line pattern is selected for each region. A pattern mask is established having the line pattern oriented differently for the respective regions. The pattern mask is transferred to an image medium such as by generating a die from the pattern mask and impressing the image medium with the die. In another method the pattern mask is placed, as itself or through a printing process, on a translucent image medium to selectively vary the transmissivity of the image medium. In all constructions color masks are formed from the pattern mask and selected colors are printed on the image medium to generally align the colors with the pattern to selectively prevent viewing of one or more of the colors at different viewing angles and generate changes in color of the viewed image as the viewing angle changes.

Figure 1A:
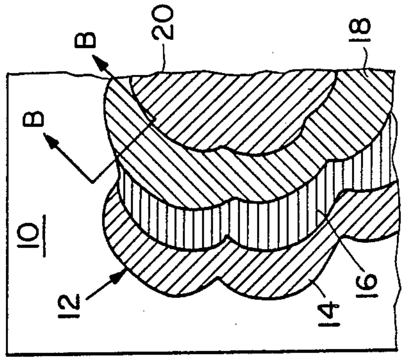
FIG. 1A is a schematic enlarged top plan partial view of a variable color print according to this invention having a cloud generated by several adjacent and differently oriented local regions.
Figure 1B:
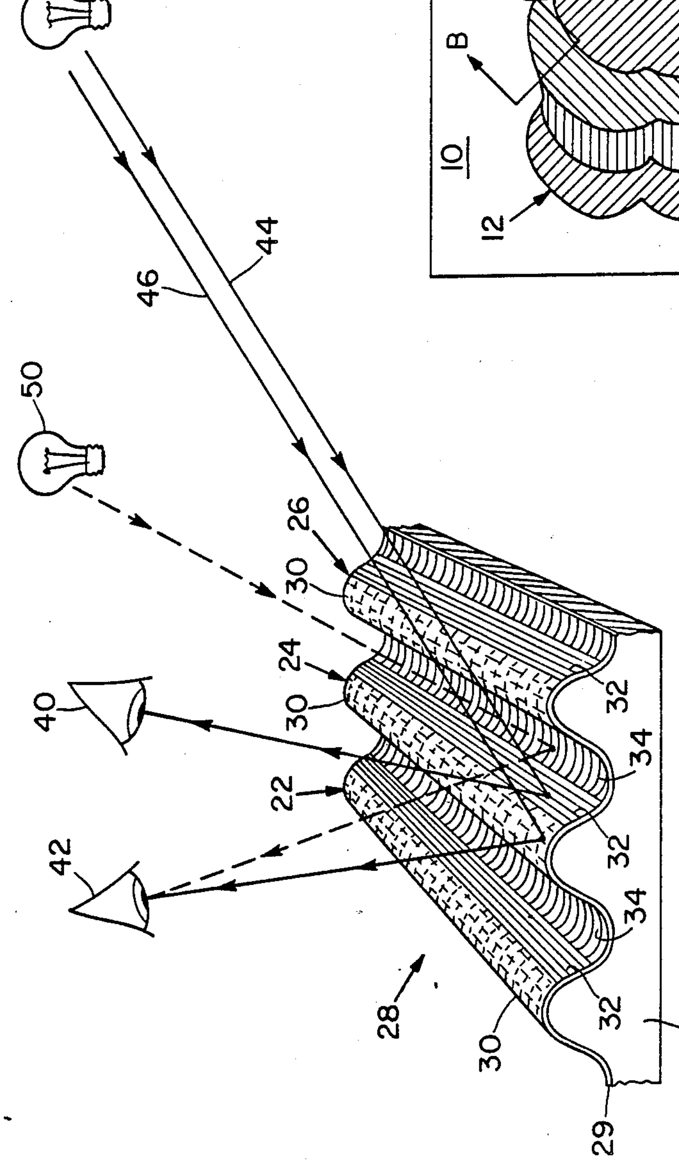
FIG. 1B is a more greatly enlarged schematic axonometric view along a portion of line B—B showing embossed grooves and aligned colors selectively subdued and revealed at different viewing angles.

A portion of variable color print 10 according to this invention is shown in FIG. 1A having cloud 12 defined in part by local image regions 14, 16, 18, 20. Each local image region has lines oriented in different directions. The lines are established in this construction by periodic grooves such as grooves 22, 24, 26, shown greatly enlarged in FIG. 1B. Grooves 22, 24, 26 are established in substrate 27 such as by heat transfer debossing of foil 29 onto substrate 27. Periodic colors 28 are then printed onto foil 29 in general alignment with grooves 22, 24, 26 which, because of reflective foil 29, serve as repeated changes in reflectivity that selectively hide or reveal colors 28 as the viewing angle changes.

In this construction, periodic colors 28 include yellow stripes 30, magenta stripes 32, and cyan stripes 34. Other colors including black and white can be substituted for or provided in addition to these colors.

The effect of changing the viewing angle is shown by the position of observers 40, 42 in relation to light rays 44, 46 from light source 48. Groove 24 reflects primarily magenta light from stripe 32 as illuminated by light ray 44 and perceived by observer 40. The cyan color from stripes 30 as illuminated by light ray 46 is reflected at a different angle which is not perceived by observer 40. However, when the viewing angle shifts such as when observer 40 moves to the position occupied by observer 42, the cyan color is perceived instead of the magenta color.

A different viewing angle can also be achieved by shifting the light source to the position occupied by light source 50. At this viewing angle observer 42 perceives yellow most strongly of all the colors 28.

Viewing a color includes perceiving the color in an image region even if other colors are also visible. A change in viewing angle, such as a change in the angle of illumination or observation, results in a change in the colors perceived as generated by grooves 22, 24, 26. Referring to FIG. 1A, at one viewing angle regions 14 and 20 appears primarily yellow, region 16 appears primarily cyan, and region 18 appears primarily magenta. Depending on the width of the printed color stripes, a greater or lesser amount of silver foil 29 may also be visible as described below.

Figure 2:
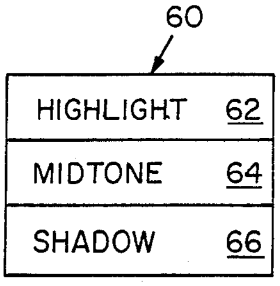
FIG. 2 is a schematic diagram of an image having three different intensities.
Figure 3A:
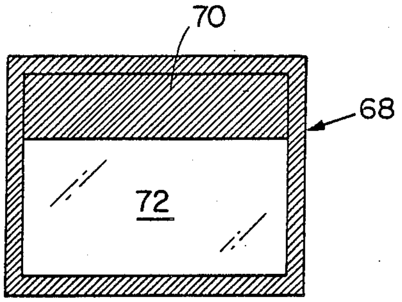
FIGS. 3A–3D are different negative and positive transparencies of the image of FIG. 2.
Figure 3B:
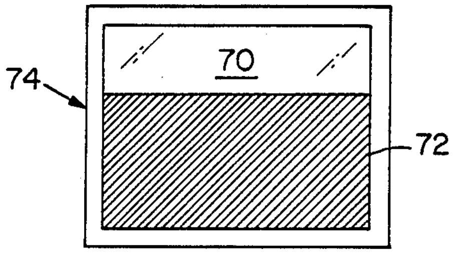
Figure 3C:
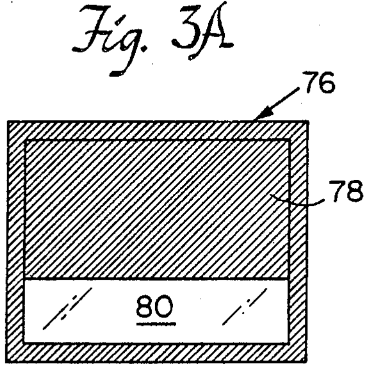
Figure 4:
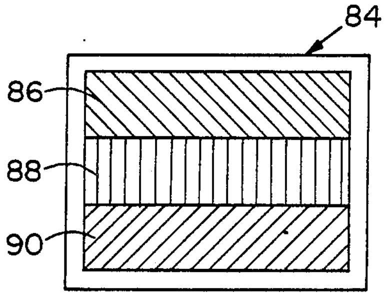
FIG. 4 is a composite pattern mask made from selected patterns and the transparencies of FIGS. 3A–3D.
Figure 5:
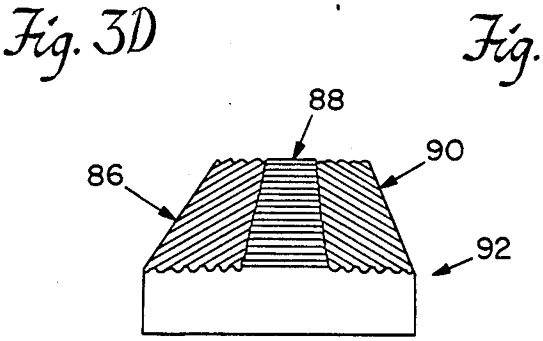
FIG. 5 is a die made from the pattern mask of FIG. 4.

One technique of forming a variable color print according to this invention utilizes a first mask to establish the periodic variations in an optical characteristic and then defines a number of color masks, one for each color to be printed, from the first mask. Different local image regions such as region 14, 16, 18, 20, FIG. 1A, can be established by hand masking or by negative-positive photographic masking. The different local image regions can be designated by identifying different image densities, hereinafter referred to as intensities, in different areas of the image. A simplified image having three intensities is shown in FIG. 2 in which image 60 has highlight intensity 62, midtone intensity 64, and shadow intensity 66. The mask for highlight intensity 62 is made in two stages, first by exposing negative transparency 68 so that the highlight intensity region 62 appears opaque in area 70 while midtone and shadow regions 64, 66 appear clear in area 72. Positive transparency 74, FIG. 3B, is then made from negative transparency 68 so that area 70 appears clear and area 72 is opaque. A conventional ruling or grid is then selected and placed between positive transparency 74 and a film to be exposed. Once exposed by contact duplication, the film then carries the pattern within area 70 as a negative transparency while area 72 remains opaque. The negative transparency for area 70 is then combined with two other masks to make a composite mask 84, FIG. 4.

Figure 3D:
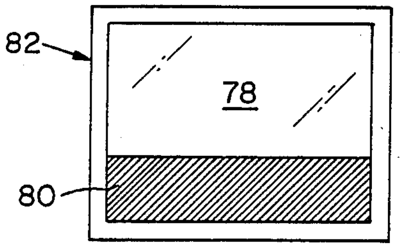

The two other masks for midtone intensity region 64 and shadow intensity region 66 are constructed as follows. A second film is exposed to image 60 for a longer period of time to form negative transparency 76 which is darkened in area 78 and clear in area 80, corresponding to shadow intensity region 66. Positive transparency 82, FIG. 3D, is then made from negative transparency 76. Midtone intensity region 64 is delineated by combining negative transparency 68 and positive transparency 82 so that darkened areas 70, 80 mask highlight intensity region 62 and shadow intensity region 66, respectively. Negative transparency 76 is used as the mask for shadow intensity region 66. The three separate color masks are then combined to form composite mask 84, FIG. 4, having different line patterns 86, 88 and 90. The angles at which the rulings are oriented are selected to contrast and form a visually appealing image.

In this construction the lines of pattern 86 extend from the base of that region at 135°, the lines of pattern 88 extend at 90°, and the lines of pattern 90 extend at 45°. The lines occupy approximately 80% of each region, leaving 20% clear space. Further, lines are spaced at 100–400 lines per inch to provide a visually pleasing image. It is desirable to provide lines spaced at at least 65 lines per inch. Providing fewer than approximately 65–100 lines per inch is acceptable but results in the perception of individual grooves or stripes of color rather than a general region of color.

Composite mask 84 is then laid over a die carrying a photosensitive resist which becomes hardened when exposed to light. After exposure, mask 84 is removed and die 92 is rinsed to reveal patterns 86, 88 and 90 etched into die 92. When the photoresist is light-hardened, die 92 exhibits a positive image of negative mask 84 so that when a substrate is struck with die 92, the patterns of negative mask 84 are reproduced on the substrate. When the photoresist is light-softened, a positive pattern is transferred to the substrate. To fabricate the reflective construction of variable color print 10, FIGS. 1A–1B, master die 92 is used in conventional heat foil transfer debossing in which reflective foil is simultaneously transferred onto a substrate such as paper while the paper is embossed. Alternative constructions are discussed below in relation to FIGS. 7–9.

Once the paper is embossed, different colors are separately printed onto the paper using color plates derived from embossing mask 84. The density of 80% line to 20% clear space of patterns 86, 88, 90 can be used to generate for each color a color image such as represented by a printing plate for that color. Each color plate carries 20% color and 80% clear space for each region for variable color print 10, FIG. 1A. Alternately, different color biases can be provided to the different regions by altering the percentage of black line of the patterns. In either case, exact registration of each color plate during printing is not important, especially when the local image regions contain lines extending at a number of different angles. The printing may be accomplished by conventional offset printing or letter press within traditional tolerances.

Figure 6A:
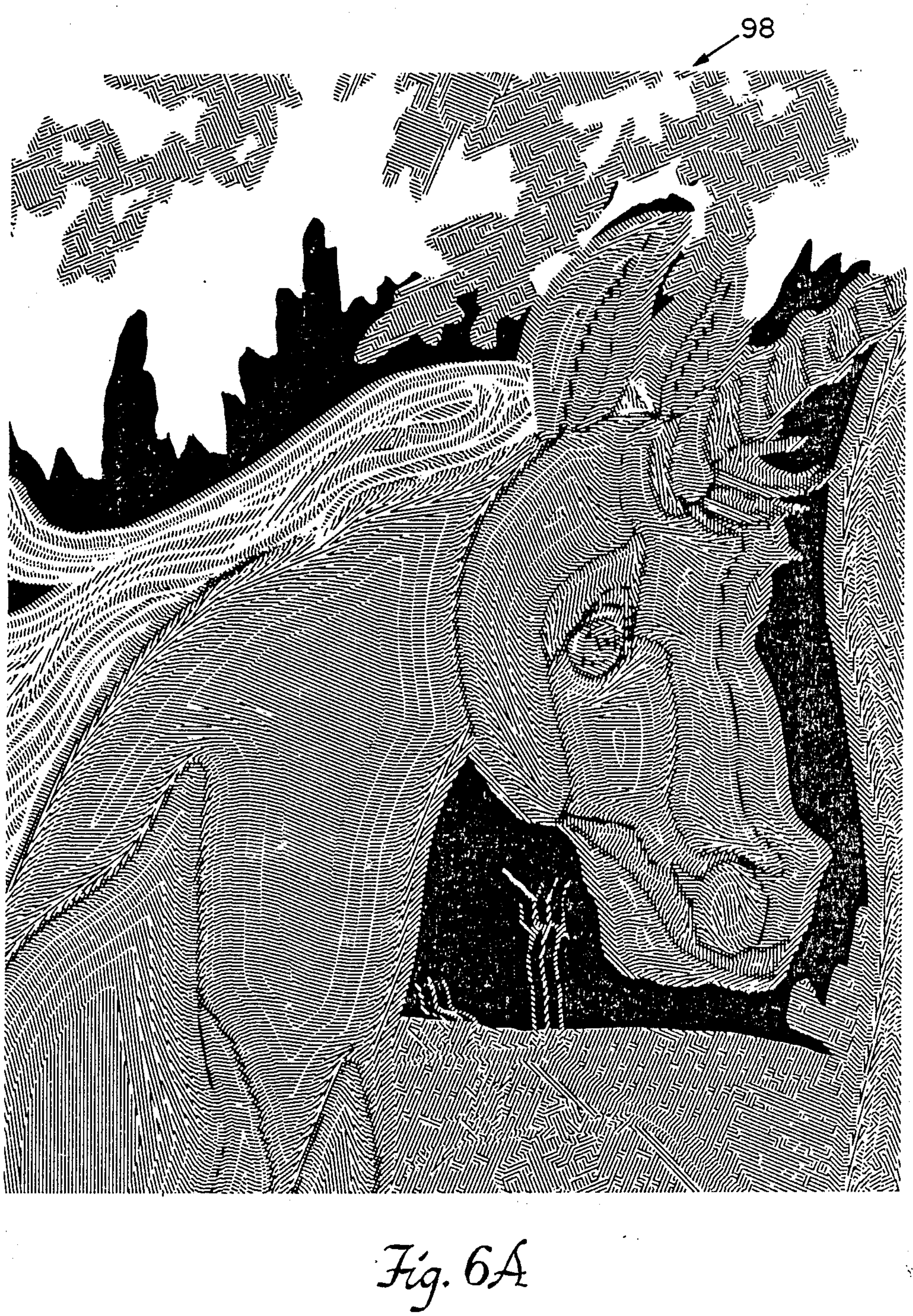
FIG. 6A is an enlarged view of a more complex pattern mask for a variable color print according to this invention.
Figure 6B:
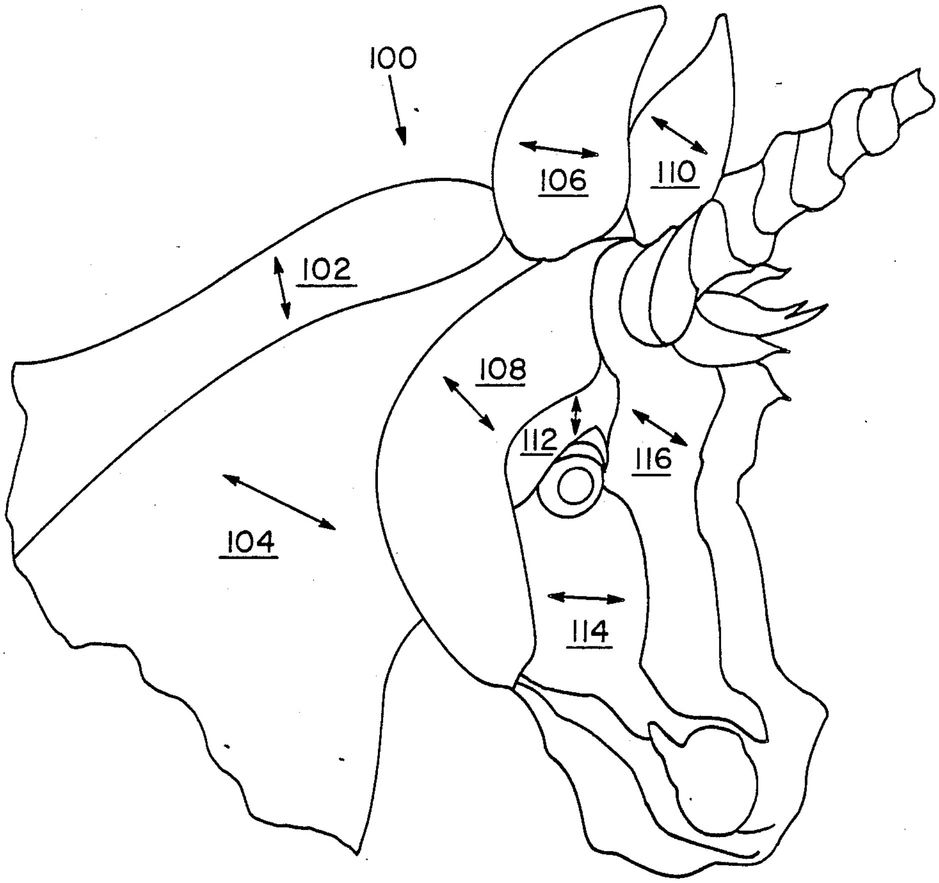
FIG. 6B is an outline of a portion of the local image regions shown in FIG. 6A.

A positive print 98 of a more complex composite embossing mask is shown in FIG. 6A, a portion of which is shown schematically in FIG. 6B. Print 98 is magnified 4 times from the actual size of the embossing mask. Unicorn 100, FIG. 6B, contains local image regions such as regions 102, 104, 106, 108, 110, 112, 114 and 116. The pattern within each local image region is generally oriented in a different direction as indicated by the respective arrows within these regions. The patterns of local image regions 102, 104 . . . 116 are selected from conventional grids and are angled to enhance details of the image and provide a more intriguing image.

Figure 7:
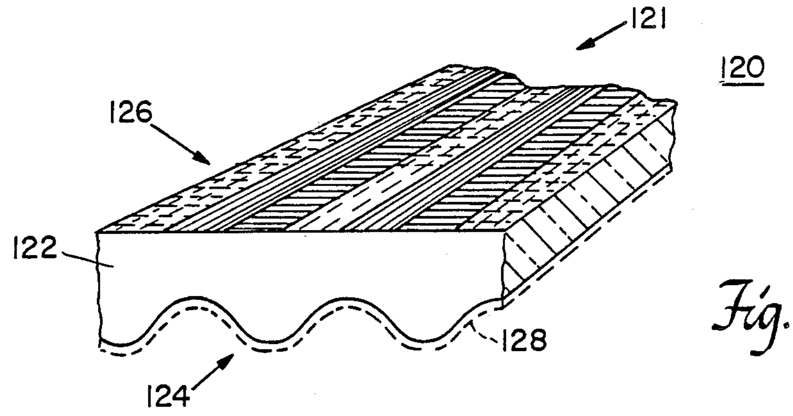
FIGS. 7–9 are schematic diagrams of alternative constructions of variable color prints according to this invention.
Figure 8:
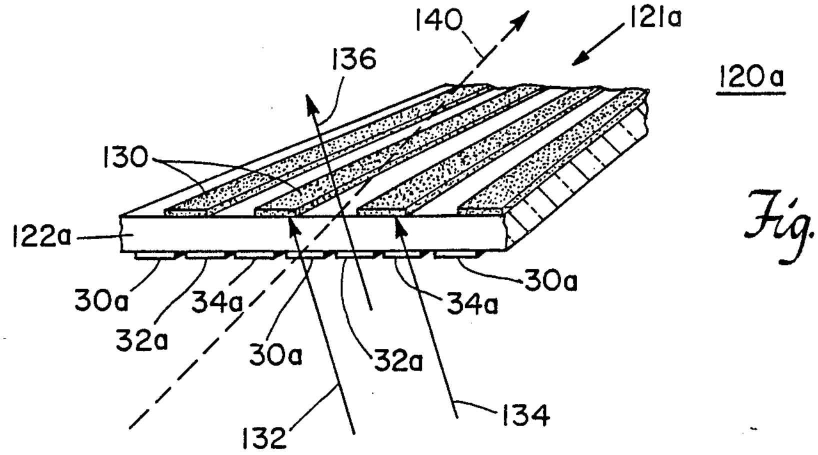
Figure 9:
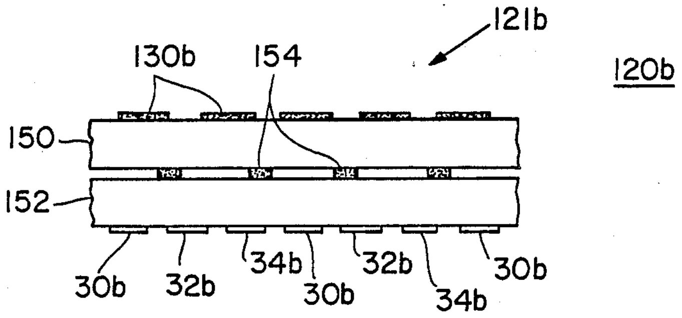

While the variable color prints described above have periodic variations in a reflective foil with colors printed directly on the foil, this is not a limitation of the invention. Periodic variations in an optical characteristic can be established using several different constructions as shown in FIGS. 7–9. Local image region 121, FIG. 7, is one of a number of differently oriented local image regions of a variable color print 120 according to this invention. Variable color print 120 is constructed from transparent substrate 122 having grooves 124 embossed on one surface while periodic variations in color 126 are printed on a second surface of substrate 122. Grooves 124 vary the transmissivity such that different colors are perceived at different viewing angles. Grooves 124 may further include reflective material 128, shown in phantom, which reflects light transmitted from above substrate 122 rather than altering transmission of light from below.

Local image region 121*a* of variable color print 120*a*, FIG. 8, achieves a similar result using cyclic opaque lines 130 on the upper surface of transparent substrate 122*a* which selectively block most portions of illuminating light, such as light rays 132, 134, while passing the remaining light rays such as ray 136. Ray 136 passes through magenta color stripe 32*a*; yellow stripe 30*a* and cyan stripe 34*a* are not perceived since rays 132, 134 are blocked by lines 130. Lines 130 occupy approximately 80% of the upper surface of transparent substrate 122*a*, leaving approximately 20% open space. When the viewing angle changes, such as by the change in illumination angle represented by dashed arrow 140, yellow color is primarily perceived rather than magenta or cyan.

Variable color print 120b, FIG. 9, establishes local image region 121b using transparent substrates 150, 152. Opaque lines 130b lie on the upper surface of substrate 150 while opposing lines 154 lie between substrates 150, 152 and are aligned with the open spaces among lines 130b. Periodic variations in color 30b, 32b, 34b are disposed on the lower surface of second substrate 152. In yet another construction, additional opaque lines, are provided among the open spaces of color stripes 30b, 32b, 34b along the lower surface of substrate 152.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of forming a variable color print of an image, comprising:
   - designating a number of different regions of the image;
   - selecting a line pattern for each region, said line patterns each including a plurality of spaced, substantially parallel lines at a density of from 100 to 400 lines per inch;
   - establishing a pattern mask of the image having the line patterns oriented differently for at least two of the respective regions;
   - transferring the pattern mask to an image medium;
   - forming a plurality of color images from the pattern mask, one color image for each color selected for print;
   - selecting a plurality of colored materials to be applied to said medium; and
   - transferring each selected colored material to the image medium to generally align the colors with the pattern to selectively prevent viewing of one or more of the colors at different viewing angles, and generate changes in color of the viewed image as the viewing angle changes.

2. The method of claim 1 in which transferring includes generating a die from the pattern mask and impressing the image medium with the die.

3. The method of claim 2 in which the impressing includes heat transfer debossing.

4. The method of claim 2 in which forming a plurality of color images includes making a printing plate for each color to represent the respective color image.

5. The method of claim 1 in which the image medium is translucent and transferring includes placing the pattern mask on the translucent image medium to selectively vary the transmissivity of the image medium.

6. The method of claim 1 in which forming a plurality of color images includes selecting different densities at which each color is to be printed for different regions of the image.

7. The variable color print formed by the method of claim 1.

8. A method of forming a variable color print of an image, comprising:
   - identifying among different region of the image at least two intensities;
   - selecting a line pattern for each intensity, said line patterns each including a plurality of spaced, substantially parallel lines at density of from 100 to 400 lines per inch;
   - establishing a pattern mask of the image having the line patterns oriented differently for the respective intensity regions;
   - transferring the pattern mask to an image medium;
   - forming a plurality of color plates from the pattern mask, one color plate for each color selected for the print;
   - selecting a plurality of colored materials to be applied to said image medium; and
   - printing each selected colored material on the image medium to generally align the colors with the pattern to selectively prevent viewing of one or more of the colors and highlight one or more other colors at different viewing angles, and generate changes in the color of the viewed image as the viewing angle changes.

* * * * *